US012348602B2

(12) United States Patent
Kawaguchi et al.

(10) Patent No.: US 12,348,602 B2
(45) Date of Patent: Jul. 1, 2025

(54) INFORMATION PROCESSING DEVICE

(71) Applicant: PIONEER CORPORATION, Tokyo (JP)

(72) Inventors: Shinpei Kawaguchi, Kawagoe (JP); Takafumi Noguchi, Kawagoe (JP); Masayoshi Suganuma, Kawagoe (JP); Yu Akabori, Kawagoe (JP); Naoyuki Mikami, Kawagoe (JP); Tomonari Mabuchi, Kawagoe (JP); Masaki Hatori, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 18/562,223

(22) PCT Filed: May 23, 2022

(86) PCT No.: PCT/JP2022/021071
§ 371 (c)(1),
(2) Date: Nov. 17, 2023

(87) PCT Pub. No.: WO2022/250005
PCT Pub. Date: Dec. 1, 2022

(65) Prior Publication Data
US 2024/0244122 A1 Jul. 18, 2024

(30) Foreign Application Priority Data

May 25, 2021 (JP) ................. 2021-087860

(51) Int. Cl.
*H04L 69/08* (2022.01)
(52) U.S. Cl.
CPC ................... *H04L 69/08* (2013.01)
(58) Field of Classification Search
CPC ............... H04L 69/08; H04L 69/14
(Continued)

(56) References Cited

U.S. PATENT DOCUMENTS 9,154,900 B1  10/2015 Addepalli et al.
10,045,277 B2 *  8/2018 Sun .................. H04L 63/123
(Continued)

FOREIGN PATENT DOCUMENTS

JP   2018117393 A    7/2018
JP   2020088512 A    6/2020
JP   2020123827 A1   8/2020

OTHER PUBLICATIONS

International Search Report for PCT/JP2022/021071 mailed Jul. 26, 2022, 4 pages.
(Continued)

*Primary Examiner* — Ruolei Zong
(74) *Attorney, Agent, or Firm* — NIXON & VANDERHYE

(57) ABSTRACT

The present invention implements switching between two protocol sets without correcting an application. An information processing device includes: a first communication processing unit for performing a communication with a first external device according to a first protocol set; and a second communication processing unit for performing a communication with a second external device according to a second protocol set, wherein, when a predetermined condition is not satisfied, the first communication processing unit transmits data received from an application to the first external device and, when the predetermined condition is satisfied, transmits the data to the second communication processing unit according to the first protocol set, and wherein the second communication processing unit transmits the data received from the first communication processing unit to the second external device according to the second protocol set.

6 Claims, 2 Drawing Sheets

(58) Field of Classification Search
USPC .......................................................... 709/230
See application file for complete search history.

(56) References Cited

U.S. PATENT DOCUMENTS

| | | | | |
|---|---|---|---|---|
| 11,089,490 | B1* | 8/2021 | Ta ......................... | H04W 24/04 |
| 2007/0032225 | A1* | 2/2007 | Konicek ............... | H04W 4/025 |
| | | | | 455/417 |
| 2015/0063331 | A1* | 3/2015 | Scahill .................. | H04W 48/20 |
| | | | | 370/338 |
| 2015/0312380 | A1* | 10/2015 | Sauerbrey ............... | H04W 4/44 |
| | | | | 455/426.1 |
| 2016/0112239 | A1* | 4/2016 | Kanugovi ............. | H04W 88/16 |
| | | | | 370/338 |
| 2017/0230871 | A1* | 8/2017 | Rangaswamy ... | H04W 36/0033 |
| 2017/0289215 | A1* | 10/2017 | Lundrigan .......... | H04L 65/1069 |
| 2017/0318047 | A1* | 11/2017 | Hampel ................ | H04W 8/005 |
| 2019/0159000 | A1* | 5/2019 | Ilami .................. | G06Q 30/0251 |

OTHER PUBLICATIONS

Written Opinion of the ISA for PCT/JP2022/021071 mailed Jul. 26, 2022, 3 pages.
Extended European Search Report, issued in European Patent Application No. 22811275.1 dated May 16, 2025.

\* cited by examiner

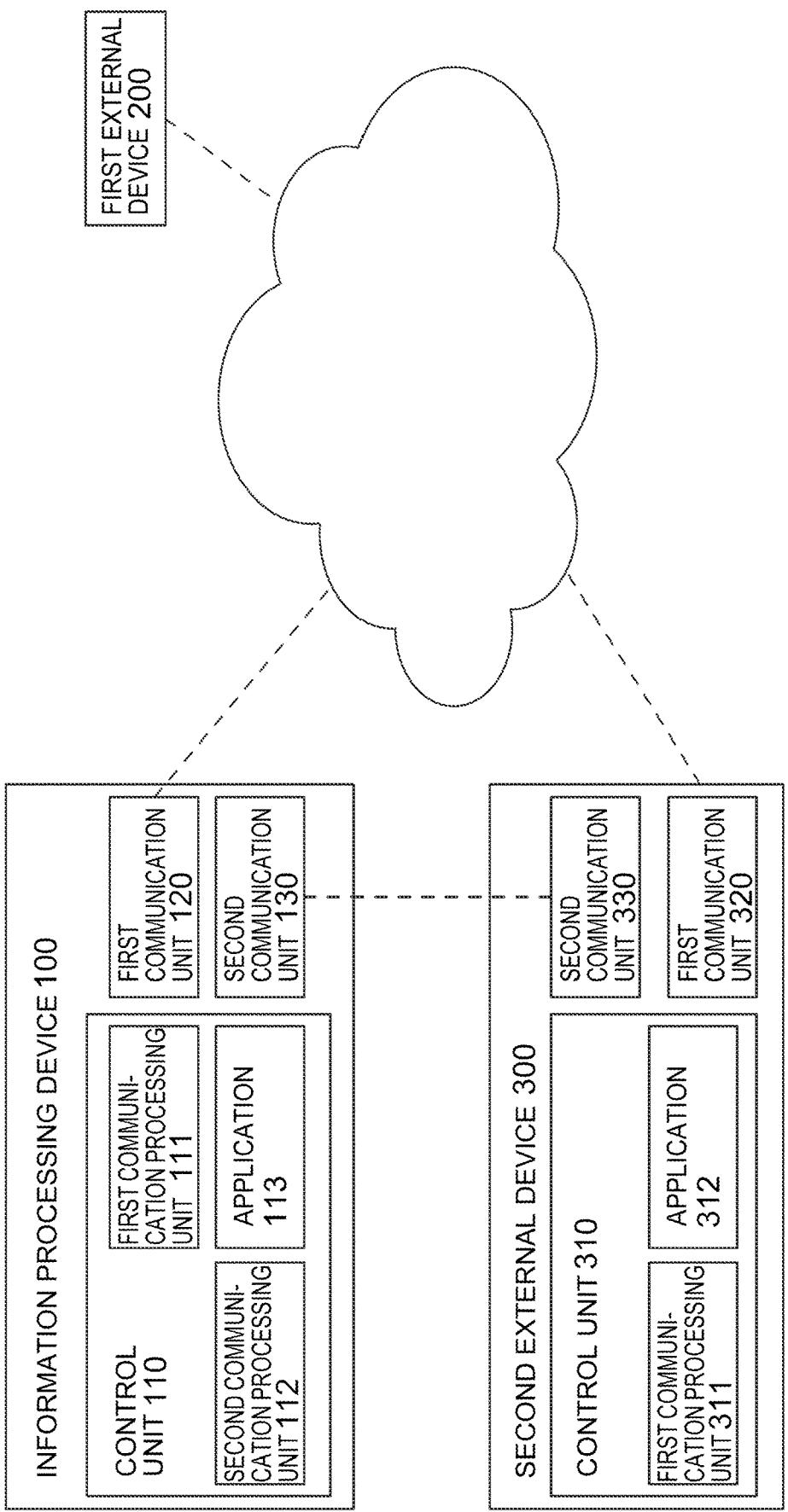

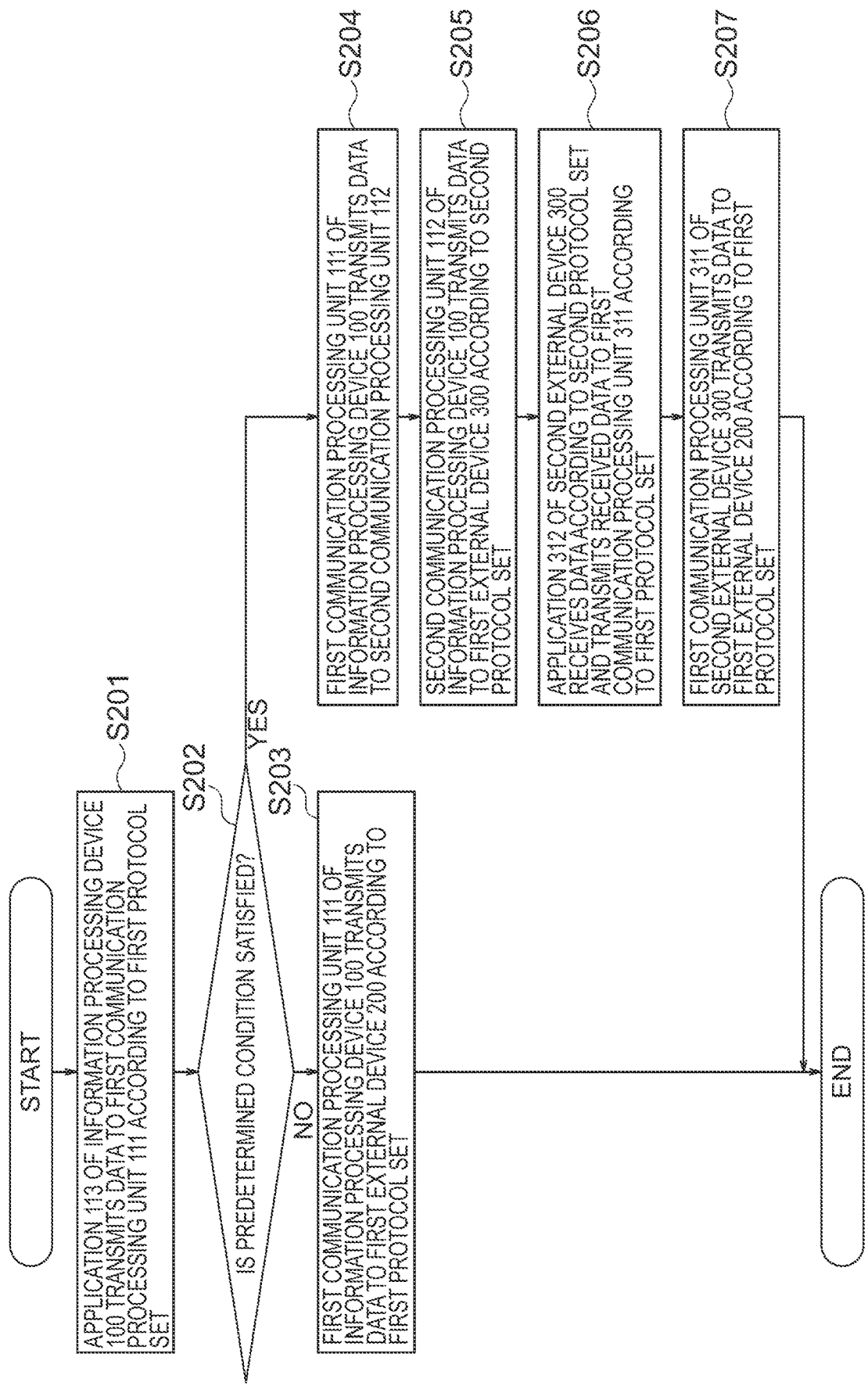

INFORMATION PROCESSING DEVICE

This application is the U.S. national phase of International Application No. PCT/JP2022/021071 filed May 23, 2022 which designated the U.S. and claims priority to JP 2021-087860 filed May 25, 2021, the entire contents of each of which are hereby incorporated by reference.

TECHNICAL FIELD

The present invention relates to an information processing device.

BACKGROUND ART

An in-vehicle device such as a navigation system has become capable of providing various services by cooperating with an external device on the Internet. Currently, TCP/IP has become popular as a standard protocol set used for a communication with the external device on the Internet. Therefore, an application installed in the in-vehicle device is developed to be capable of using a communication according to this TCP/IP.

The in-vehicle device is connected to the external device on the Internet via, for example, a communication terminal device that includes a function to connect to a mobile communication system such as LTE or the like. At this time, in a communication between the in-vehicle device and the communication terminal device, a communication that follows an original protocol set which is different from TCP/IP may be used.

For example, Patent Document 1 discloses a technique that switches an IP address of a sending destination in the application to implement switching between the communication that follows TCP/IP and the communication that follows the original protocol set.

RELATED ART DOCUMENTS

Patent Documents

Patent Document 1: JP 2020-88512 A

SUMMARY OF THE INVENTION

However, in an application developed by another company, it is necessary to modify the application in order to implement the technique disclosed in Patent Document 1.

One of the problems to be solved by the present invention is to implement switching between two protocol sets without modifying the application.

Solution of the Problem

In order to solve the above-described problem, the invention according to claim 1 includes:
a first communication processing unit for performing a communication with a first external device according to a first protocol set; and
a second communication processing unit for performing a communication with a second external device according to a second protocol set,
in which, when a predetermined condition is not satisfied, the first communication processing unit transmits data received from an application to the first external device and, when the predetermined condition is satisfied, transmits the data to a second communication processing unit according to the first protocol set, and
in which the second communication processing unit transmits the data received from the first communication processing unit to the second external device according to the second protocol set.

The invention according to claim 4 is an information processing method executed by a computer, the computer including:
a first communication processing unit for performing a communication with a first external device according to a first protocol set; and
a second communication processing unit for performing a communication with a second external device according to a second protocol set,
the information processing method includes:
a step in which, when a predetermined condition is not satisfied, data received from the application is transmitted to the first external device by the first communication processing unit and, when the predetermined condition is satisfied, the data is transmitted to the second communication processing unit according to the first protocol set; and
a step in which the data received from the first communication processing unit is transmitted to the second external device by the second communication processing unit according to the second protocol set.

The invention according to claim 5 causes a computer to execute the information processing method according to claim 4.

The invention according to claim 6 stores the information processing program according to claim 5.

BRIEF DESCRIPTION OF DRAWINGS

FIG. 1 is a diagram illustrating an information processing device 100 according to an example of the present invention.

FIG. 2 is a diagram illustrating an example of a processing operation executed in the information processing device 100 and a second external device 300 when transmitting data to a first external device 200.

EMBODIMENTS

An information processing device according to an embodiment of the present invention includes: a first communication processing unit for performing a communication with a first external device according to a first protocol set; and a second communication processing unit for performing a communication with a second external device according to a second protocol set, in which, when a predetermined condition is not satisfied, the first communication processing unit transmits data received from the application to the first external device and, when the predetermined condition is satisfied, transmits the data to a second communication processing unit according to the first protocol set, and in which the second communication processing unit transmits the data received from the first communication processing unit to the second external device according to the second protocol set. Therefore, in the present embodiment, it is possible to perform not only a communication according to the first protocol set but also a communication according to the second protocol set by only transmitting the data to a first communication processing unit 111 according to the first protocol set by an application of the information processing device. Therefore, in the present embodiment, even when the application is an application developed by another company, it is possible to use a communication according to an original protocol set in addition to a communication according to a standard protocol set without modifying the application.

The predetermined condition may be that the communication according to the second protocol set with the second external device is possible. This way, when the communication with the second external device is possible, the application becomes capable of transmitting data from the first external device via the second external device.

The information processing device may further include a relaying unit that relays a communication between the first communication processing unit and the second communication processing unit, the first communication processing unit may replace a sending destination of data received from the application with an own device from the first external device if the predetermined condition is satisfied, and the relaying unit may transmit the data in which the sending destination is the own device from the first communication processing unit to the second communication processing unit. In this way, in a case where the first communication processing unit performs the communication according to a standard communication protocol set (for example, TCP/IP), it becomes possible to minimize modification of the first communication processing unit.

The information processing method according to an embodiment of the present invention executed by a computer including: the first communication processing unit for performing the communication with the first external device according to the first protocol set; and the second communication processing unit for performing the communication with the second external device according to the second protocol set, the information processing method includes: a step in which, when the predetermined condition is not satisfied, data received from the application is transmitted to the first external device by the first communication processing unit according to the first protocol set and, when the predetermined condition is satisfied, the data is transmitted to the second communication processing unit; and a step in which the data received from the first communication processing unit is transmitted to the second external device by the second communication processing unit according to the second protocol set. Therefore, in the present embodiment, it is possible to perform not only the communication according to the first protocol set but also the communication according to the second protocol set by only transmitting the data to the first communication processing unit 111 according to the first protocol set by the application of the information processing device. For this reason, in the present example, even when the application is the application developed by another company, it is possible to use the communication according to the original protocol set in addition to the communication according to the standard protocol set without modifying the application.

An information processing program according to the one embodiment of the present invention causes a computer to execute the information processing method described above. Therefore, in the present embodiment, it is possible to use the communication according to the original protocol set in addition to the communication according to the standard protocol set without modifying the application by using the computer.

A computer-readable storage medium according to the one embodiment of the present invention stores the information processing program described above. Therefore, in the present embodiment, in addition or alternatively to incorporating the above-mentioned information processing program into a device, the information processing program can be distributed alone, and version upgrade or the like can be easily performed.

EXAMPLE

<Information Processing Device 100>

FIG. 1 is a diagram illustrating an information processing device 100 according to an example of the present invention. The information processing device 100 is, for example, an in-vehicle device such as a navigation system or the like, and performs a communication with a first external device 200 provided on the Internet. The information processing device 100 can perform the communication via the second external device 300 (for example, communication portable terminal such as smartphone or the like) when performing the communication with a first external device 200.

The information processing device 100 includes a control unit 110, a first communication unit 120, and a second communication unit 130. The control unit 110 is configured of a computer. The first communication unit 120 is a communication device for performing a communication using a mobile communication system, and the communication device for performing the communication of a mobile communication standard such as, for example, LTE or 5G, 6G or the like. The second communication unit 130 is a communication device for performing a wireless communication with a device located at a short distance (for example, the second external device 300), and the communication device for performing the communication of a short distance communication standard such as, for example, Wi-Fi™ or Bluetooth™ or the like.

The control unit 110 includes a first communication processing unit 111, a second communication processing unit 112, and an application 113.

The first communication processing unit 111 performs processing for performing the communication with the first external device 200 connected to the Internet according to a first protocol set, and the second communication processing unit 112 performs the processing for performing the communication with the second external device 300 at the short distance according to a second protocol set. The first protocol set is a standard communication protocol set, for example, TCP/IP. The second protocol set is a protocol set that is different from the first protocol set, for example, an original protocol set.

The application 113 is an application that performs processing including transmitting and receiving of data with, for example, the first external device 200 connected to the Internet. When the application 113 is the application that implements a function of a navigation system, the application 113 e.g. transmits position information of a vehicle in which the information processing device 100 is installed to the first external device 200, and receives information (for example, traffic congestion information) at the position from the first external device 200.

The application 113 transmits and receives the data to and from the first external device 200 according to the first protocol set. For example, the application 113 transmits the data having the first external device 200 as a sending destination to the first communication processing unit 111 to transmit the data to the first external device 200 according to the first protocol set. Then, the first communication processing unit 111 processes the data received from the application 113 such that the communication according to the first protocol set can be performed, and transmits the data to the first external device 200.

When the first protocol set is TCP/IP, the first communication processing unit 111 is configured of a TCP module that performs capsulation or decapsulation of a TCP header or establishment of a connection or the like, an IP module that performs the capsulation or the decapsulation of an IP header or packetization or the like, and an Ethernet net module that performs the capsulation or the decapsulation of an Ethernet header or framing or the like.

When the first protocol set is TCP/IP, an IP address of the first external device 200 is set as the sending destination for the data to be transmitted to the first external device 200. In addition, an IP address of the information processing device 100 is set as the sending destination for the data that is transmitted to the application from the first external device 200, and as a port number, the port number of the application is set.

The first communication processing unit 111 uses the first communication unit 120 or the second communication unit 130 when transmitting the data to the first external device 200. In a case where the first communication processing unit 111 transmits the data to the first external device 200 by using the second communication unit 130, the data is transmitted to the first external device 200 via another communication device (for example, second external device 300). When the first protocol set is TCP/IP, the communication via this second external device 300 is the communication using a tethering function of the second external device 300, and the second external device 300 functions as a router in this communication.

In the present example, if a predetermined condition is not satisfied, the first communication processing unit 111 transmits the data received from the application 113 to the first external device 200 according to the first protocol set as described above. On the other hand, if the predetermined condition is satisfied, the first communication processing unit 111 transmits the data received from the application 113 to the second communication processing unit 112. Then, the second communication processing unit 112 transmits the data received from the first communication processing unit 111 to a second external device 200 from the second communication unit 130 according to the second protocol set.

The predetermined condition described above may be that, for example, the communication with the second external device 200 according to the second protocol set is possible. That is, for example, if the communication with the second external device 200 according to the second protocol set is possible, the first communication processing unit 111 transmits the data received from the application 113 to the second communication processing unit 112. If, for example, the communication between the information processing device 100 and the second external device 300 by the second communication unit 130 is in connection and a later-described application 312 is activated in the second external device 300, the first communication processing unit 111 may determine that the communication with the second external device 200 according to the second protocol set is possible.

The predetermined condition above may be that, for example, there is an input to instruct to use the communication according to the second protocol set from a user. That is, for example, when there is the input to instruct to use the communication according to the second protocol set from the user, the first communication processing unit 111 transmits the data received from the application 113 to the second communication processing unit 112.

The second external device 300 includes a control unit 310, a first communication unit 320, and a second communication unit 330. The control unit 310 is configured of the computer. The first communication unit 320 is the communication device for performing the communication using the mobile communication system, and the communication device for performing the communication of the mobile communication standard such as, for example, LTE or 5G and 6G or the like. The second communication unit 330 is the communication device for performing the wireless communication with the device located at the short distance, and the communication device for performing the communication of the short distance communication standard such as, for example, Wi-Fi™ or Bluetooth™ or the like.

The control unit 310 of the second external device 300 includes a first communication processing unit 311 and the application 312.

The first communication processing unit 311 executes processing for performing the communication with the first external device 200 which is connected to the Internet according to the first protocol set.

The application 312 receives data transmitted from the information processing device 100 according to the second protocol set by the second communication unit 330, and transmits this received data to the first communication processing unit 311 according to the first protocol set by setting the first external device 200 as the sending destination. Then, the first communication processing unit 311 processes the data received from the application 312 such that the communication according to the first protocol set can be performed, and transmits the data to the first external device 200 by the first communication unit 330.

As described above, in the present example, it is possible to perform not only the communication according to the first protocol set but also the communication according to the second protocol set by only transmitting the data to the first communication processing unit 111 according to the first protocol set by the application 113 of the information processing device 100. For this reason, in the present example, even when the application is an application developed by another company, it is possible to use the communication according to the original protocol set in addition to the communication according to the standard protocol set without correcting the application.

FIG. 2 is a diagram illustrating an example of a processing operation executed in the information processing device 100 and the second external device 300 when transmitting the data to the first external device 200. The application 113 of the information processing device 100 transmits the data having the first external device 200 as the sending destination to the first communication processing unit 111 according to the first protocol set (step S201). The first communication processing unit 111 of the information processing device 100 checks whether or not the predetermined condition is satisfied (step S202).

If the predetermined condition is not satisfied (step S202, No), the first communication processing unit 111 of the information processing device 100 processes the data received from the application 113 such that the communication according to the first protocol set can be performed, and transmits the data to the first external device 200 by the first communication unit 120 or the second communication unit 130 (step S203).

If the predetermined condition is satisfied (step S202, Yes), the first communication processing unit 111 of the information processing device 100 transmits the data received from the application 113 to a second communication processing unit (step S204). Then, the second communication processing unit 112 of the information processing device 100 transmits the data received from the first communication processing unit 111 to the second external device 200 by the second communication unit 330 according to the second protocol set (step S205).

The application 312 of the second external device 200 receives the data transmitted from the information processing device 100 according to the second protocol set by the second communication unit 330, and transmits this received data to the first communication processing unit 311 by setting the first external device 200 as the sending destination according to the first protocol set (step S206). The first communication processing unit 311 processes the data received from the application 312 such that the communication according to the first protocol set can be performed, and transmits the data to the first external device 200 by the first communication unit 320 (step S207).

The information processing device 100 may receive the data from the first external device 200 via the second external device 300, for example, as follows. When the data from the first external device 200 is received by the first communication unit 320, the first communication processing unit 311 of the second external device 300 transmits the data addressed to the application 312 of the second external device 300 to the application 312. The application 312 of the second external device 300 transmits the data received from the first communication processing unit 311 to the information processing device 100 by the second communication unit 330 according to the second protocol set. When the data is received from the second external device 300, the second communication processing unit 112 of the information processing device 100 transmits this data to the first communication processing unit 111. When the data is received from the second communication processing unit 112, the first communication processing unit 111 of the information processing device 100 transmits this data to the application 113.

<Relaying Unit 114>

The control unit 110 may include a relaying unit 114 that relays the communication between the first communication processing unit 111 and the second communication processing unit 112.

For example, the first communication processing unit 111 may replace the sending destination of this data with an own device if, for example, the predetermined condition described above is satisfied when receiving the data from the application 113, and the relaying unit 114 may transmit, for example, to the second communication processing unit 112 from the first communication processing unit 111 the data in which a sending destination address in the first protocol set is the own device.

At this time, if the first protocol set is TCP/IP, the TCP module of the first communication processing unit 111 may replace the IP address of the sending destination of the data received from an application 111 with a loop-back address. Then, the relaying unit 114 may transmit the data having the loop-back address as the sending destination to the second communication processing unit 112. The relaying unit 114 may be implemented by, for example, middleware.

The present invention has been described above with reference to preferred embodiments of the present invention. Although the present invention has been described with reference to specific examples, various modifications and changes can be made to these specific examples without departing from the spirit and scope of the present invention specified in the claims.

REFERENCE SIGNS LIST

100 Information processing device
110 Control unit
111 First communication processing unit
112 Second communication processing unit
113 Application
114 Relaying unit
120 First communication unit
130 Second communication unit
200 First external device
300 Second external device
310 Control unit
311 First communication processing unit
312 Application
320 First communication unit
330 Second communication unit

The invention claimed is:

1. An information processing device comprising:
a memory storing executable instructions and data;
a first communication processor configured to execute the executable instructions to perform a communication with a first external device according to a first protocol set; and
a second communication processor configured to execute the executable instructions to perform a communication with a second external device according to a second protocol set, the second protocol set being different from the first protocol set,
wherein, when a predetermined condition is not satisfied, the first communication processor transmits the data received from an application to the first external device according to the first protocol set, and, when the predetermined condition is satisfied, transmits the data to the second communication processor according to the first protocol set, and
wherein the second communication processor transmits the data received from the first communication processor to the second external device according to the second protocol set.

2. The information processing device according to claim 1,
wherein the predetermined condition is that the communication with the second external device according to the second protocol set is possible.

3. The information processing device according to claim 1, further comprising a relay that relays a communication between the first communication processor and the second communication processor,
wherein the first communication processor replaces a sending destination of the data received from the application with an own device from the first external device when the predetermined condition is satisfied, and
wherein the relay transmits the data in which the sending destination is the own device from the first communication processor to the second communication processor.

4. The information processing device according to claim 2, further comprising a relay that relays a communication between the first communication processor and the second communication processor,
wherein the first communication processor replaces a sending destination of the data received from the application with an own device from the first external device when the predetermined condition is satisfied, and
wherein the relay transmits the data in which the sending destination is the own device from the first communication processor to the second communication processor.

5. An information processing method executed by a computer, the computer including a memory storing executable instructions and data, a first communication processor configured to execute the executable instructions to perform a communication with a first external device according to a first protocol set, and a second communication processor configured to execute the executable instructions to perform a communication with a second external device according to a second protocol set, the second protocol set being different from the first protocol set, the information processing method comprising:

- when a predetermined condition is not satisfied, transmitting the data received from an application to the first external device by the first communication processor according to the first protocol set, and, when the predetermined condition is satisfied, transmitting the data to the second communication processor according to the first protocol set; and
- transmitting the data received from the first communication processor to the second external device by the second communication processor according to the second protocol set.

6. A non-transitory computer-readable storage medium storing an information processing program that causes a computer to perform the information processing method according to claim 5 when the information processing program is executed by the computer.

* * * * *